United States Patent [19]
Orth, Jr.

[11] 3,733,594
[45] May 15, 1973

[54] ALARM APPARATUS FOR DETECTING AND INDICATING OIL SLICKS

[76] Inventor: George Otto Orth, Jr., 10612 Riviera Place N.E., Seattle, Wash. 98125

[22] Filed: Mar. 13, 1972

[21] Appl. No.: 234,296

[52] U.S. Cl. ............... 340/236, 73/308, 73/322.5, 73/453, 200/84 R, 340/244 A
[51] Int. Cl. ..................... G08b 21/00, G01n 9/18
[58] Field of Search ............ 340/236, 244 A, 244 B, 340/224, 272; 73/308, 322.5, 453, 451, 421; 200/84 R; 325/116; 137/312; 324/6.5 R

[56] References Cited

UNITED STATES PATENTS

| | | | |
|---|---|---|---|
| 1,708,033 | 4/1929 | Short | 340/236 UX |
| 2,161,441 | 6/1939 | Vickers | 73/322.5 X |
| 3,428,074 | 2/1969 | Perren | 137/312 |
| 3,603,952 | 9/1971 | Smith | 340/224 |

FOREIGN PATENTS OR APPLICATIONS

| | | | |
|---|---|---|---|
| 1,399,477 | 4/1965 | France | 324/6.5 |

*Primary Examiner*—John W. Caldwell
*Assistant Examiner*—Daniel Myer
*Attorney*—Richard W. Seed et al.

[57] ABSTRACT

Oil slicks floating on the surface of a body of water are detected by a device which floats on the body of water. The device incorporates therein a hydrophobic oil absorbent material which also floats on the surface of the water. On contact with the oil of an oil slick, the hydrophobic oil absorbent material absorbs the oil and sinks into the water. When the float of hydrophobic absorbent material sinks to a predetermined depth in the water, an alarm signaling device is actuated to indicate the presence of the oil slick.

9 Claims, 4 Drawing Figures

Patented May 15, 1973 3,733,594

ALARM APPARATUS FOR DETECTING AND INDICATING OIL SLICKS

BACKGROUND OF THE INVENTION

1. Field of the Invention

This invention relates to a detector device for detecting the presence of oil slicks floating on the surface of a body of water.

2. Prior Art Relating to the Disclosure

Due to increasingly stringent anti-spill regulations regulating loading and/or unloading of crude oil, gasoline or other such substances from tankers, barges or other vessels, it is important to detect any spillage as soon as possible after occurrence so preventive measures can be undertaken before the oil slick spreads and becomes unmanagable. During night-time operations or under certain overcast conditions oil slicks on bodies of water are not readily detected by visual means until significant amounts of oil have already been spilled. The detector device disclosed herein is capable of detecting the presence of oil slicks before any major amount of spillage can occur.

SUMMARY OF THE INVENTION

This invention relates to a detector for detecting the presence of oil floating on the surface of a body of water, the detector comprising a housing floating on the body of the water, the housing incorporating a hydrophobic, oil-absorbent material which, in the absence of oil, floats on the surface of the body of water, and on absorption of oil triggers a signal indicating the presence of oil on the surface of the water.

It is an object of this invention to provide a relatively inexpensive, reliable means of detecting the presence of oil floating on the surface of a body of water.

It is a further object of this invention to provide an oil detecting device which incorporates a hydrophobic, oil absorbent material, which floats on the surface of the water and triggers a signal indicating the presence of oil on the surface of the water.

DETAILED DESCRIPTION OF THE INVENTION

The term "oil", as used in this application is intended to mean animal or vegetable oils not miscible with water or liquids not miscible with water but soluble in ether, naphtha, alcohol, or other organic solvents, and which remains in the essentially the liquid state when floating on a body of water. Generally, natural oils are what is intended, these being mixtures of hydrocarbon oil and their oxidation products, such as crude petroleum and distillation products thereof.

Figure 1:
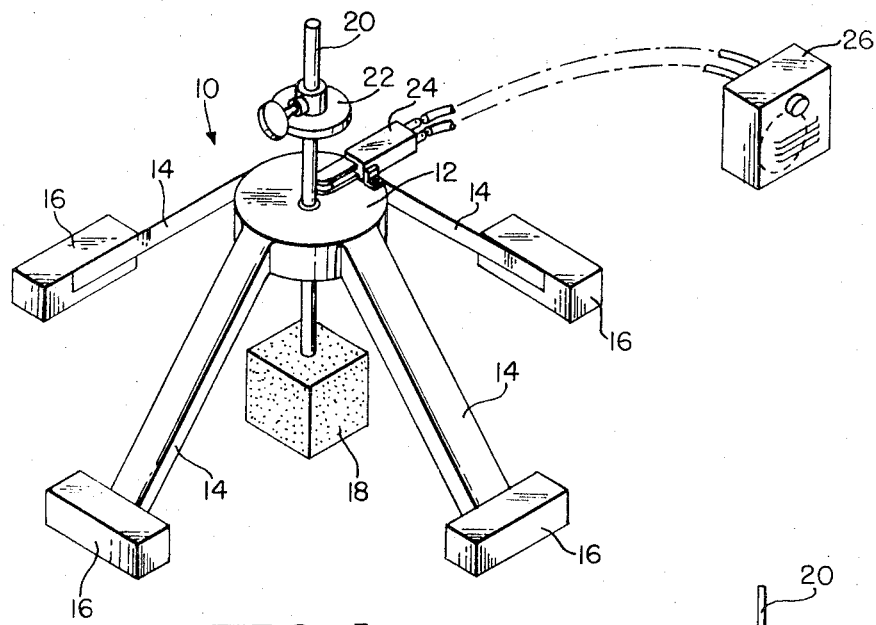
FIG. 1 is a perspective view of the detector device of this invention.
Figure 2:
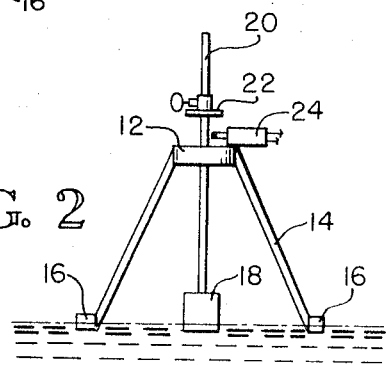
FIG. 2 is a side view of the detector device of FIG. 1 illustrating the location of the oil absorbent material in the absence of an oil slick floating on the body of water.

Referring to FIG. 1, the detector device of this invention includes a housing, an oil absorbent material which is hydrophobic in nature, a support therefor attached to the housing, and signal means indicating when the oil absorbent material has become saturated with oil and sinks into the water. The housing 10 includes a substantially horizontal platform 12 from which extend legs 14, each of the legs at their lower ends having attached thereto flotation members 16. The housing may be made of any suitable material such as wood, plastic, metal and may be of any shape. The housing is designed to float on the surface of the body of water. An oil absorbent material 18 in a batt or block form, in the absence of oil, floats on the surface of the water and when saturated with oil, sinks into the water. The absorbent material is secured to a support 20 which extends upwardly through an opening in the platform 12 of the housing 10. On the upper end of the support rod is secured a retainer washer 22. The oil absorbent material may be a hydrophobic, low density organic or inorganic material which normally floats on the surface of water and, when saturated with oil, sinks into the water. Examples of materials which may be used include: (1) a low density cellulosic fiber batt treated to render the cellulosic fibers making up the batt essentially hydrophobic and oil absorbent by precipitation of a paraffinic hydrocarbon wax such as Paracol 505M, a tradename of Hercules, Inc., or other similar material onto the fibers; (2) a low density open-celled organic foam such as a polyurethane or polyacrylic foam having a density of from about 1 to 5 lbs. per cubic foot; (3) an open-celled cellulosic foam having incorporated therein a material which renders the foamed article oil absorbent and hydrophobic as, for example, the incorporation of wetting agents of the type described in U. S. Pat. No. 2,367,384, hereby incorporated by reference; (4) an inorganic porous material treated or impregnated so as to be hydrophobic and oil absorbent, as, for example, pumice, vermiculite, expanded perlite bonded together or volcanic rock treated with an organosilane such as dichlorodimethylsilane as disclosed in U. S. Pat. No. 3,464,920, hereby incorporated by reference.

Figure 3:
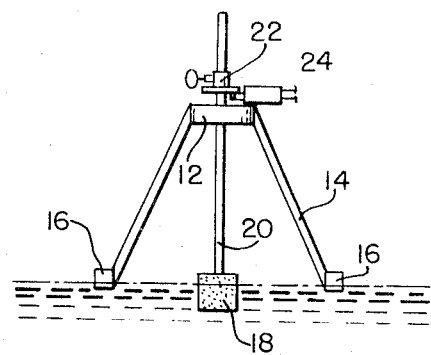
FIG. 3 is a side view of the device of FIG. 1 illustrating action of the detector device when saturated with oil.

The support rod 20 should be free to move vertically relative to the housing 10. The adjustable washer 22 is clamped to the upper end of the rod at a position such that when the material 18 absorbs oil to the extent that it sinks into the water as illustrated by FIG. 3, the washer will close the contacts of a switch such as the microswitch 24 shown mounted on the housing. Closing of the switch triggers a visual or aural signal indicating the presence of an oil slick on the body of water. The signal device 26 may be of any suitable type, either battery powered or powered from an electrical circuit. The signal device is attached by conductive wiring to the microswitch 24. Rather than the signal means shown other conventional signal means may be used which are mechanical, electro-mechanical or electronic in nature which, when the oil absorbent material absorbs oil to the extent that it sinks into the water, triggers the signal.

The rate at which the material 18 absorbs oil will depend on the oil absorbent material and the viscosity of the oil floating on the body of water. Depending on the type of oil being loaded or unloaded the retaining washer 22 can be adjusted upward or downward on the support rod. As a general rule the more viscous the oil the slower the absorption rate of the oil absorbent material.

Figure 4:
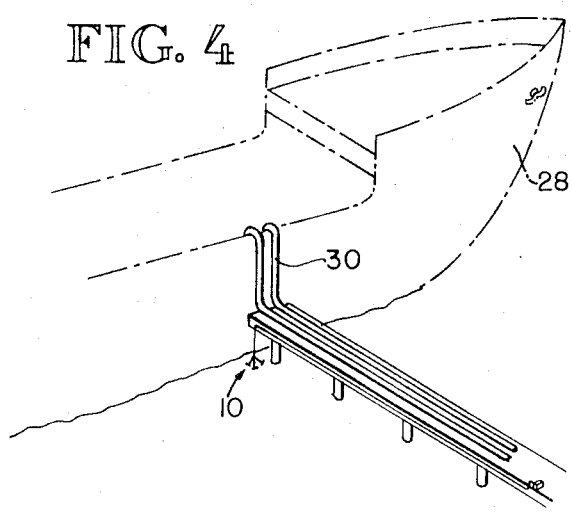
FIG. 4 is a partial perspective view illustrating one means of locating the detector device near where a tanker is being unloaded.

In using the detector device of this invention one or a series of the devices are connected together by a flexible means and strung around a tanker being loaded or unloaded. FIG. 4 illustrates a possible location of a detector device near the point where a tanker 28 is being loaded or unloaded through conduit lines 30. The detector device may also be employed in other locations where there is a likelihood of an oil spill.

The embodiments of the invention in which a particular property or privilege is claimed are defined as follows:

1. A detector for detecting the presence of oil floating on a body of water comprising:
    a housing,
    a hydrophobic oil absorbent material carried by the housing which, in the absence of oil, floats on the surface of a body of water, and, on contact with the oil absorbs such, and
    signal means rendered operative when the oil absorbent material has absorbed oil floating on the surface of the body of water.

2. The detector of claim 1 wherein the oil absorbent material is a batt of low density wood fiber wherein each fiber is substantially completely coated with a hydrophobic oil absorbent material.

3. The detector of claim 1 wherein the oil absorbent material is an open-celled cellulosic foam incorporating therein a hydrophobic, oil absorbent material.

4. The detector of claim 1 wherein the oil absorbent material is an open-celled hydrophobic organic foam capable of absorbing oil thereinto.

5. The detector of claim 1 wherein the oil absorbent material is an inorganic porous material treated with an organo-silane.

6. A detector for detecting the presence of oil floating on a body of water comprising:
    a housing floating on the body of water,
    a hydrophobic, oil absorbent material carried by the housing which, in the absence of oil, floats on the surface of the body of water and, on contact with the oil, absorbs such to its unit capacity, and
    signal means carried by the housing rendered operative when the oil absorbent material has absorbed oil to the extent that it sinks into the body of water.

7. The detector of claim 6 including a support attached to the oil absorbent material and the housing allowing free vertical movement of the oil absorbent material.

8. The detector of claim 1 wherein the support is a rod connected at one end to the oil absorbent material and extending vertically through the housing for relative vertical movement between the housing and the rod.

9. The detector of claim 8 wherein the signal means includes switch means mounted on the housing which activates indicator means operatively connected to the switch means to indicate the presence of oil floating on the body of water.

* * * * *